United States Patent
Yu et al.

(10) Patent No.: US 10,274,184 B2
(45) Date of Patent: Apr. 30, 2019

(54) DUST PREVENTION AND HEAT DISSIPATION MODULE AND LIGHT SOURCE SYSTEM OF COLOUR WHEEL

(71) Applicant: APPOTRONICS CHINA CORPORATION, Shenzhen (CN)

(72) Inventors: Qiang Yu, Shenzhen (CN); Hong Ye, Shenzhen (CN); Wei Lin, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 68 days.

(21) Appl. No.: 15/305,069

(22) PCT Filed: Apr. 22, 2015

(86) PCT No.: PCT/CN2015/077137
§ 371 (c)(1),
(2) Date: Oct. 18, 2016

(87) PCT Pub. No.: WO2015/161789
PCT Pub. Date: Oct. 29, 2015

(65) Prior Publication Data
US 2017/0184297 A1    Jun. 29, 2017

(30) Foreign Application Priority Data
Apr. 22, 2014  (CN) .................. 2014 2 01980591 U

(51) Int. Cl.
*G02B 26/00* (2006.01)
*F21V 29/67* (2015.01)
(Continued)

(52) U.S. Cl.
CPC .............. *F21V 29/673* (2015.01); *F21V 9/08* (2013.01); *F21V 29/502* (2015.01);
(Continued)

(58) Field of Classification Search
CPC .... F21V 29/673; F21V 29/502; F21V 29/677; F21V 9/08; F21V 31/005; G02B 26/008;
(Continued)

(56) References Cited

U.S. PATENT DOCUMENTS

| 2002/0039174 A1* | 4/2002 | Yamada ................. G03B 21/16 353/31 |
| 2005/0108996 A1* | 5/2005 | Latham .............. B01D 46/0023 55/385.2 |

(Continued)

FOREIGN PATENT DOCUMENTS

| CN | 1696820 A | 11/2005 |
| CN | 10256342 | * 9/2008 |

(Continued)

OTHER PUBLICATIONS

International Search Report in the parent PCT application No. PCT/CN2015/077137, dated Jul. 17, 2015.

(Continued)

*Primary Examiner* — Anh T Mai
*Assistant Examiner* — Fatima N Farokhrooz
(74) *Attorney, Agent, or Firm* — Chen Yoshimura LLP

(57) ABSTRACT

A dust prevention and heat dissipation module for a color wheel and a light source system employing the same. The color wheel is sealed in a color wheel housing which has an air inlet and an air outlet. The dust prevention and heat dissipation module has a leading-in air channel in communication with the air inlet of the housing, a leading-out air channel in communication with the air outlet of the housing, a filtering device at an inlet of the leading-in air channel and an outlet of the leading-out air channel, and a fan which circulate the air via the leading-in air channel and the leading-out air channel. The air flow caused by the fan realizes heat dissipation of the color wheel, and the filtering (Continued)

device filters the air flowing through the color wheel housing, thereby reducing the amount of dust adhered to the surface of the color wheel.

10 Claims, 2 Drawing Sheets

(51) Int. Cl.
*G03B 21/14* (2006.01)
*G03B 21/16* (2006.01)
*F21V 29/502* (2015.01)
*F21V 9/08* (2018.01)
*F21V 31/00* (2006.01)
*G02B 27/00* (2006.01)
*H04N 9/31* (2006.01)

(52) U.S. Cl.
CPC .......... *F21V 29/677* (2015.01); *F21V 31/005* (2013.01); *G02B 26/008* (2013.01); *G02B 27/0006* (2013.01); *G03B 21/14* (2013.01); *G03B 21/16* (2013.01); *H04N 9/31* (2013.01)

(58) Field of Classification Search
CPC .... G02B 27/0006; G03B 21/14; G03B 21/16; H04N 9/31
See application file for complete search history.

(56) References Cited

U.S. PATENT DOCUMENTS

| 2005/0254015 | A1 | 11/2005 | Kim |
| 2006/0170876 | A1 | 8/2006 | Takemi et al. |
| 2006/0209267 | A1* | 9/2006 | Hirosawa ............... G03B 21/16 353/58 |
| 2009/0040471 | A1 | 2/2009 | Noda et al. |
| 2009/0141248 | A1* | 6/2009 | Suzuki ................ G03B 21/16 353/61 |
| 2011/0032489 | A1* | 2/2011 | Kimoto ................. G03B 21/16 353/56 |
| 2011/0211170 | A1 | 9/2011 | Hagino et al. |
| 2011/0242499 | A1* | 10/2011 | Terao ..................... G03B 21/16 353/57 |
| 2012/0047857 | A1* | 3/2012 | Hashiba ............... G03B 21/145 55/385.4 |
| 2012/0062854 | A1 | 3/2012 | Noda et al. |
| 2012/0097376 | A1 | 4/2012 | Lin et al. |

FOREIGN PATENT DOCUMENTS

| CN | 101256342 A | 9/2008 |
| CN | 201562114 U | 8/2010 |
| CN | 102455580 A | 5/2012 |
| CN | 203883953 U | 10/2014 |
| EP | 2026127 A1 | 2/2009 |
| JP | 2001-142146 A | 5/2001 |
| JP | 2001-281613 A | 10/2001 |
| JP | 2006301368 A | 11/2006 |
| JP | 2009-134201 A | 6/2009 |
| JP | 2010-008627 A | 1/2010 |
| JP | 2011-075971 A | 4/2011 |
| JP | 2011-180223 A | 9/2011 |
| JP | 2013-88478 A | 5/2013 |

OTHER PUBLICATIONS

IPRP in the parent PCT application No. PCT/CN2015/077137, dated Oct. 25, 2016.
Korean Office Action, dated Oct. 28, 2017 in a counterpart application KR 10-2016-7032506.
Korean Office Action, dated May 28, 2018 in a counterpart application KR 10-2016-7032506.
Japanese Office Action, dated Aug. 29, 2017 in a counterpart Japanese patent application, No. JP 2016-564059.
Japanese Office Action, dated Apr. 3, 2018 in a counterpart Japanese patent application, No. JP 2016-564059.
Extended European Search Report, dated Sep. 29, 2017 in corresponding application EP 15782769.2.
Korean Office Action, dated Dec. 28, 2017 in a counterpart application KR 10-2016-7032506.
Korean Office Action, dated Dec. 20, 2018 in a counterpart application KR 10-2016-7032506.

* cited by examiner

DUST PREVENTION AND HEAT DISSIPATION MODULE AND LIGHT SOURCE SYSTEM OF COLOUR WHEEL

BACKGROUND OF THE INVENTION

Field of the Invention

This invention relates to heat dissipation technologies, and in particular, it relates to a dust prevention and heat dissipation module for a color wheel and a light source system using the same.

Description of Related Art

As shown in FIG. 1, a conventional light source module includes a color wheel 01, a color wheel housing 02, a fan 03, a light source 04 and a heat dissipation device for the light source (not shown). The working principle of this system is: the light source 04 generates an excitation light, illuminated on the color wheel 01; then, a wavelength conversion material on the color wheel converts the excitation light to a converted light for output. The main heat dissipation method for the conventional light source module is: the housing 02 is open, to increase the heat exchange between the color wheel 01 and the ambient air, to achieve heat dissipation.

However, such heat dissipation method, which exposes the color wheel to ambient air, causes dust in the air to adhere to the color wheel surface. The dust absorbs excitation light and hinders absorption of the excitation light by the wavelength conversion material on the color wheel, which affects the efficiency and life of the color wheel. In particular, when the light source module is used in a dirty environment, the dust on the color wheel surface may significantly increase, which significantly affects the efficiency and life of the color wheel. This in turn affects the efficiency and life of the entire light source module.

SUMMARY

To solve the above problems, embodiments of the present invention provide a dust prevention and heat dissipation module for a color wheel and a light source system using the same. It improves the efficiency and life of the color wheel, and improves the efficiency and life of the light source module that incorporates the color wheel.

In one aspect, the present invention provides a dust prevention and heat dissipation module for a color wheel, wherein the color wheel is sealed in a color wheel housing, the color wheel housing having an air inlet and an air outlet, where the dust prevention and heat dissipation module includes: a leading-in air channel coupled to the air inlet of the color wheel housing, a leading-out air channel coupled to the air outlet of the color wheel housing, a filtering device provided at an inlet of the leading-in air channel and at an outlet of the leading-out air channel, and a fan which pumps the air in via the leading-in air channel and out via the leading-out air channel.

Preferably, the filtering device includes a first filtering device disposed at the inlet of the leading-in air channel and a second filtering device disposed at the outlet of the leading-out air channel.

Preferably, the fan is blast fan disposed between the first filtering device and the air inlet of the leading-in air channel, or an exhaust fan disposed between the second filtering device and the air outlet of the leading-out air channel.

Preferably, the air inlet of the leading-in air channel and the air outlet of the leading-out air channel share the filtering device, wherein the filtering device includes a first filtering region corresponding to the air inlet and a second filtering region corresponding to the air outlet.

Preferably, the dust prevention and heat dissipation module further includes a dust prevention chamber, which includes a first cavity and a second cavity isolated from each other, wherein the leading-in air channel is coupled to the first cavity, and the leading-out air channel is coupled to the second cavity, wherein the fan is disposed in the first cavity or the second cavity, and the filtering device is disposed on the dust prevention chamber, and wherein the first cavity is adapted for the first filtering region and the second cavity is adapted for the second filtering region.

Preferably, the filtering device is a preliminary filter or a high-efficiency filter.

Preferably, the filtering device is a two-stage filtering device, including a first stage filter and a second stage filter, wherein the first stage filter is a preliminary filter or a high-efficiency filter, and the second stage filter is a preliminary filter or a high-efficiency filter.

Preferably, a pressing plate is provided between the first stage filter and the second stage filter, and wherein the second stage filter has a finer mesh than the first stage filter.

In another aspect, the present invention provides a light source system, which includes: the dust prevention and heat dissipation module; and a light source module fixedly coupled to the dust prevention and heat dissipation module for color wheel, the light source module including: a light source; a color wheel housing fixedly coupled to the light source; and a color wheel sealed in the color wheel housing.

Preferably, the air inlet of the color wheel housing is aligned with a hottest point of the color wheel.

Compared to conventional technologies, embodiments of the present invention have the following advantages:

In the dust prevention and heat dissipation module of the present invention, by using a color wheel sealed within the color wheel housing, the fan can cause the air flow in the leading-in air channel and the leading-out air channel, which achieves heat dissipation for the color wheel; meanwhile, the filtering device filters the air that flows through the color wheel housing, which prevents dust in the ambient air from entering the color wheel housing via the leading-in air channel and the leading-out air channel. This reduces dust adhered on the color wheel surface, improves the efficiency of the color wheel and prolongs its life. When a light source system incorporates such a color wheel, it improves the efficiency of the light source system and prolongs its life.

DETAILED DESCRIPTION OF PREFERRED EMBODIMENTS

Details of the various embodiments of the present invention are described below with reference to the drawings.

Figure 1:
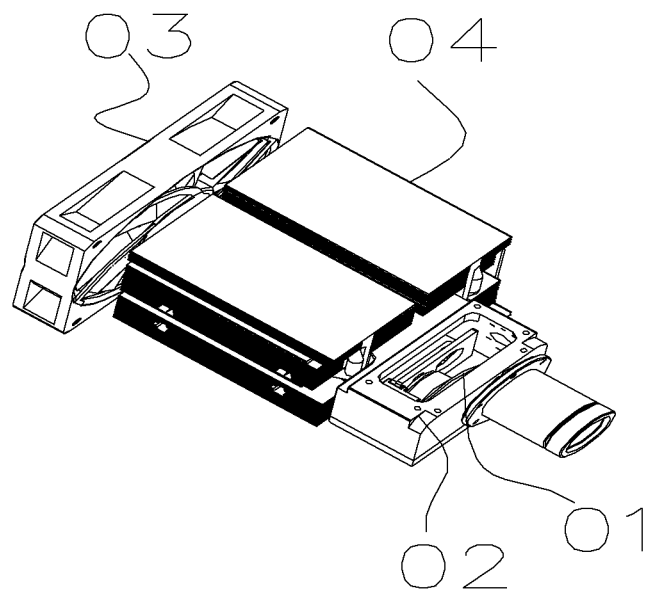
FIG. 1 schematically illustrates the structure of a conventional light source module.
Figure 2:
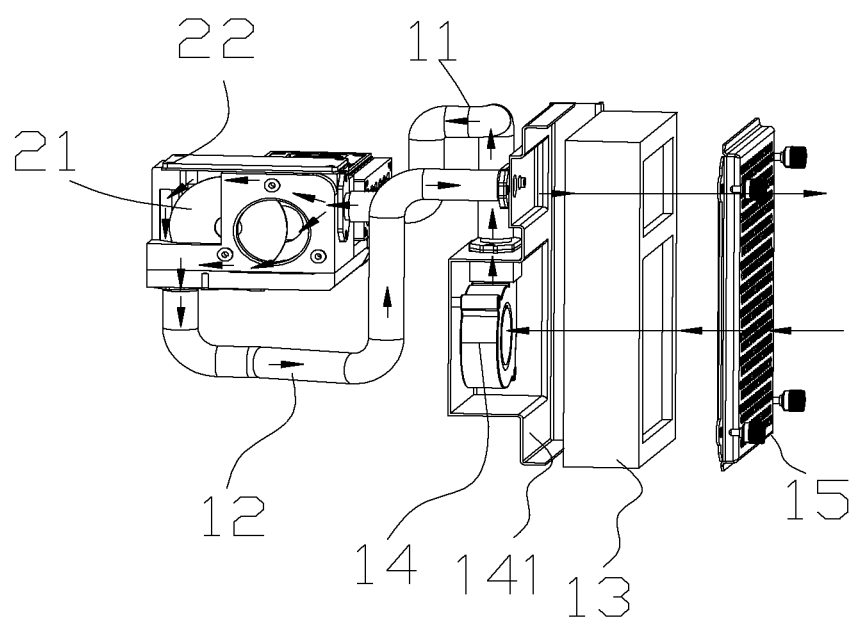
FIG. 2 schematically illustrates the structure of a dust prevention and heat dissipation module according to a first embodiment of the present invention.

In a dust prevention and heat dissipation module according to a first embodiment of the present invention, shown in FIG. 2, the color wheel 21 is sealed within the color wheel housing 22. The color wheel housing 22 has an air inlet and an air outlet. The dust prevention and heat dissipation module includes: a leading-in air channel 11 coupled to the air inlet of the color wheel housing 22, a leading-out air channel 12 coupled to the air outlet of the color wheel housing 22, a filtering device 13 provided at an inlet of the leading-in air channel 11 and at an outlet of the leading-out air channel 12, and a fan 14 which pumps the air in via the leading-in air channel 11 and out via the leading-out air channel 12.

In the dust prevention and heat dissipation module of the present embodiment, by sealing the color wheel 21 within the color wheel housing 22, the fan 14 can cause the air flow in the leading-in air channel 11 and the leading-out air channel 12, which achieves heat dissipation for the color wheel 21; meanwhile, the filtering device 13 filters the air that flows through the color wheel housing 22, which prevents dust in the ambient air from entering the color wheel housing 22 via the leading-in air channel 11 and the leading-out air channel 12. This reduces dust adhered on the surface of the color wheel 21, and improves the efficiency of the color wheel 21 and prolongs its life.

In this embodiment, the air inlet of the leading-in air channel 11 and the air outlet of the leading-out air channel 12 share one filtering device. The filtering device 13 includes: a first filtering region corresponding to the air inlet and a second filtering region corresponding to the air outlet, where the first filtering region covers the air inlet and the second filtering region covers the air outlet, to prevent dust from entering the leading-in air channel 11 and the leading-out air channel 12, preventing pollution of the color wheel 21. An advantage of sharing one filtering device is that it reduces the size of the dust prevention and heat dissipation module for the color wheel, making it easy to form a modular system.

In this embodiment, the fan 14 is a blast fan disposed between the first filtering region and the air inlet of the leading-in air channel 11. Using the blast fan, outside air is guided into the color wheel housing 22 via the leading-in air channel 11. Because the pressure inside the color wheel housing 22 is higher than that of the outside, the air is guided out of the color wheel housing 22 via the leading-out air channel 12, achieving heat dissipation for the color wheel 21.

In this embodiment, the dust prevention and heat dissipation module for the color wheel further includes a dust prevention chamber 141, which has a first cavity and a second cavity isolated from each other. The leading-in air channel 11 is coupled to the first cavity, and the leading-out air channel 12 is coupled to the second cavity. The fan 14 is disposed in the first cavity, and the filtering device 13 is disposed on the dust prevention chamber 141, where the first cavity is adapted for the first filtering region and the second cavity is adapted for the second filtering region.

The purpose of isolating the first and second cavities of the dust prevention chamber 141, the adaptation of the first cavity for the first filtering region and the adaptation of the second cavity for the second filtering region is to separate the air inlet of the leading-in air channel 11 and the air outlet of the leading-out air channel 12, preventing the air from mixing which may reduce the heat dissipation effect.

In this embodiment, the dust prevention and heat dissipation module for the color wheel further includes a protective cover 15 disposed on a side of the filtering device 13 that faces away from the air inlet of the leading-in air channel 11 and the air outlet of the leading-out air channel 12. This protects and secures the filtering device 13 to prevent damage due to outside factors.

In this embodiment, the filtering device 13 may be a preliminary filter or a high-efficiency filter, so long as it can filter the air that enters the color wheel housing 22 and achieves desired dust prevention effect.

In the above embodiment, the fan may also be an exhaust fan disposed between the second filtering region and the air outlet of the leading-out air channel. As another alternative, both a blast fan between the first filtering region and the air inlet of the leading-in air channel and an exhaust fan between the second filtering region and the air outlet of the leading-out air channel are used. All of the above designs can achieve the purpose of air circulation and therefore heat dissipation.

In the above embodiment, the filtering device may also include a first filtering device disposed at the air inlet of the leading-in air channel and a second filtering device disposed at the air outlet of the leading-out air channel; i.e., the filtering device is a split structure. This can achieve the same dust filtering function.

In the above embodiment, the area of the first cavity is preferably larger than the area of the second cavity, and correspondingly, the area of the first filtering region is preferably larger than the area of the second filtering region. This is because the first filtering region is the filtering region for the incoming air, which is the primary filtering region and largely determines the dust prevention effect. So with the same amount of air flow, the larger the area of the first filtering region, the smaller the required air pressure. This leads to better the filtering effect and longer cleaning cycle required for the filtering device.

Figure 3:
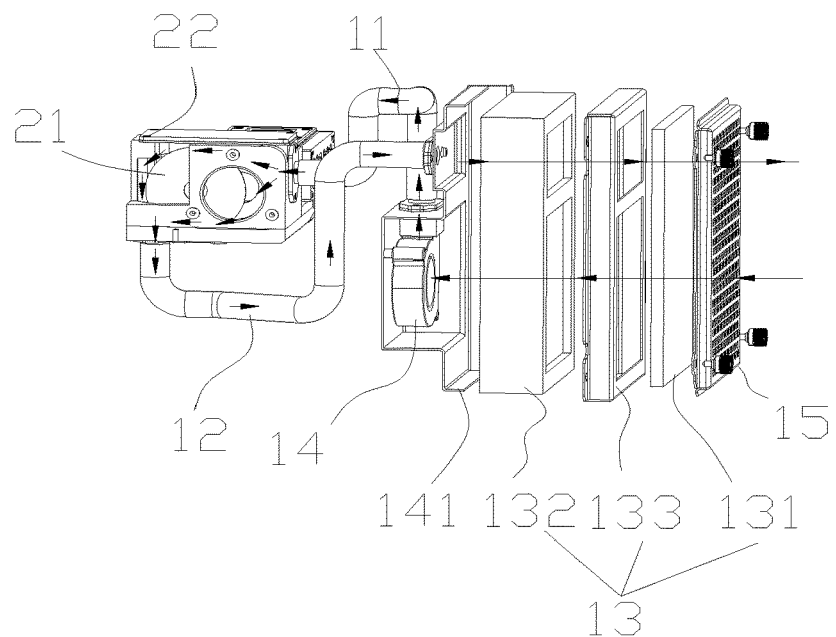
FIG. 3 schematically illustrates the structure of a dust prevention and heat dissipation module according to a second embodiment of the present invention.
Figure 4:
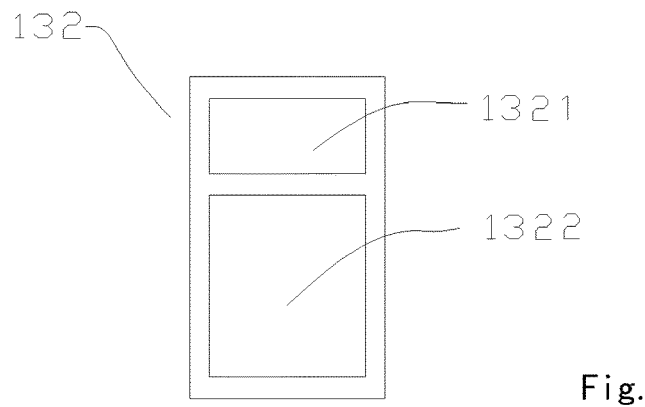
FIG. 4 schematically illustrates the structure of the second stage filter in the embodiment of FIG. 3.

A dust prevention and heat dissipation module for the color wheel according to the second embodiment is shown in FIGS. 3 and 4. One difference of the second embodiment from the first embodiment is that the filtering device 13 here is a two-stage filtering device, including a first stage filter 131 and a second stage filter 132. The second stage filter 132 is located on the side of the first stage filter 131 that faces the color wheel 21. The first stage filter 131 preliminarily filters the air and the second stage filter 132 further filters the air before it enters the color wheel housing 22. This further reduces the amount of dust entering the color wheel housing 22, increasing the efficiency of the color wheel 21 and prolonging its life.

In this embodiment, a pressing plate 133 is provided between the first stage filter 131 and the second stage filter 132, to affix the first stage filter 131 and the second stage filter 132 relative to each other. The first stage filter 131 may be a preliminary filter or a high-efficiency filter, and the second stage filter 132 may be a preliminary filter or a high-efficiency filter; i.e., the first stage filter 131 and the second stage filter 132 may both be preliminary filters or both be high-efficiency filters, or the first stage filter 131 may be a preliminary filter and the second stage filter 132 may be a high-efficiency filter. Of course, when the second stage filter 132 has a finer mesh than the first stage filter 131, the filtering effect is better.

As shown in FIG. 4, the second stage filter 132 includes a first filtering region 1322 and a second filtering region 1321, and the area of the first filtering region 1322 is larger than the area of the second filtering region 1321.

Figure 5:
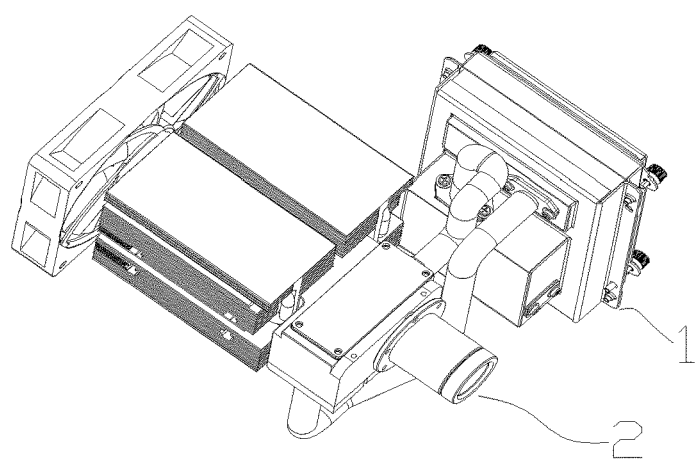
FIG. 5 schematically illustrates the structure of a light source system according to an embodiment of the present invention.

Further, an embodiment of the present invention provides a light source system, as shown in FIG. 5, which includes: a color wheel dust prevention and heat dissipation module 1 according to any of the above embodiments, and a light source module 2 fixedly coupled to the color wheel dust prevention and heat dissipation module 1. The light source module 2 includes: a light source, a color wheel housing fixedly coupled to the light source, and a color wheel sealed in the color wheel housing. The color wheel housing has an air inlet and an air outlet. The leading-in air channel is coupled to the air inlet of the color wheel housing, and the leading-out air channel is coupled to the air outlet of the color wheel housing, to provide sealed heat dissipation for the color wheel. During heat dissipation, the filtering device is used to filter the air that flows through the color wheel housing, to prevent outside dust from entering the color wheel housing via the leading-in air channel and the leading-out air channel. This reduces dust adhering on the color wheel surface, improves the efficiency of the color wheel and prolongs its life. When the color wheel is used with the light source module 2 to form the light source system, it improves the efficiency of the light source system and prolongs its life.

In this embodiment, the air inlet of the color wheel housing is aligned with the hottest point of the color wheel, which increases the heat dissipation rate of the color wheel and enhances the heat dissipation effect of the color wheel. This improves the life of the color wheel, and in turn improves the life of the light source system.

The above descriptions of the embodiments allow those skilled in the art to practice this invention. It will be apparent to those skilled in the art that various modification and variations can be made in the light source system and related methods of the present invention without departing from the spirit or scope of the invention. Thus, it is intended that the present invention cover modifications and variations that come within the scope of the appended claims and their equivalents.

What is claimed is:

1. A dust prevention and heat dissipation module for a color wheel, wherein the color wheel is sealed in a color wheel housing, the color wheel housing having an air inlet which is an opening of the housing and an air outlet which is another opening of the housing, the dust prevention and heat dissipation module comprising:
   a leading-in air channel coupled to the air inlet of the color wheel housing, the leading-in air channel having an elongated tubular section through which air passes before entering the color wheel housing;
   a leading-out air channel coupled to the air outlet of the color wheel housing the leading-out air channel having an elongated tubular section through which air passes after leaving the color wheel housing, wherein the leading-in air channel and the leading-out air channel are separate and disjoined from each other;
   a dust prevention chamber, wherein the leading-in air channel and the leading-out air channel are both coupled to the dust prevention chamber;
   a filtering device which includes a first filtering device disposed between an ambient and an inlet of the leading-in air channel and a second filtering device disposed between an outlet of the leading-out air channel and the ambient, wherein the first filtering device and the second filtering device are disposed on the dust prevention chamber and in a same plane; and
   a fan located within the dust prevention chamber, which pumps air from the ambient into the color wheel housing via the leading-in air channel and out of the color wheel housing to the ambient via the leading-out air channel.

2. The dust prevention and heat dissipation module for color wheel of claim 1, wherein the fan is blast fan disposed between the first filtering device and the air inlet of the leading-in air channel, or an exhaust fan disposed between the second filtering device and the air outlet of the leading-out air channel.

3. The dust prevention and heat dissipation module for color wheel of claim 1, wherein the color wheel is sealed in a color wheel housing, the color wheel housing having an air inlet and an air outlet, the dust prevention and heat dissipation module comprising:
   wherein the air inlet of the leading-in air channel and the air outlet of the leading-out air channel share the filtering device, and wherein the filtering device includes a first filtering region disposed at the air inlet and a second filtering region disposed at the air outlet.

4. The dust prevention and heat dissipation module for color wheel of claim 1, wherein the filtering device is a preliminary filter or a high-efficiency filter.

5. The dust prevention and heat dissipation module for color wheel of claim 1 wherein the filtering device is a two-stage filtering device, including a first stage filter and a second stage filter, wherein the first stage filter is a preliminary filter or a high-efficiency filter, and the second stage filter is a preliminary filter or a high-efficiency filter.

6. A light source system, comprising:
   the dust prevention and heat dissipation module for color wheel of claim 1; and
   a light source module fixedly coupled to the dust prevention and heat dissipation module for color wheel, the light source module including:
   a light source;
   a color wheel housing fixedly coupled to the light source; and
   a color wheel sealed in the color wheel housing.

7. The dust prevention and heat dissipation module for color wheel of claim 1, wherein the fan is either located at an end of the elongated tubular section of the leading-in air channel away from the air inlet of the color wheel housing, or located at an end of the elongated tubular section of the leading-our air channel away from the air outlet of the color wheel housing.

8. The dust prevention and heat dissipation module for color wheel of claim 3, wherein the dust prevention chamber, includes a first cavity and a second cavity isolated from each other, wherein the leading-in air channel is coupled to the first cavity, and the leading-out air channel is coupled to the second cavity, wherein the fan is disposed in the first cavity or the second cavity, and wherein the first cavity is adapted for the first filtering region and the second cavity is adapted for the second filtering region.

9. The dust prevention and heat dissipation module for color wheel of claim 5, further comprising a pressing plate disposed between the first stage filter and the second stage filter, and wherein the second stage filter has a finer mesh than the first stage filter.

10. The light source system of claim 6, wherein the air inlet of the color wheel housing is aligned with a hottest point of the color wheel.

* * * * *